Feb. 9, 1960 A. W. H. CARTER 2,924,823
SEPARATE ADJACENT ANTENNAS FOR DIFFERENT BANDS
WITH MEANS TO REDUCE CROSS COUPLING
Filed Oct. 10, 1955 2 Sheets-Sheet 1

Inventor
A. W. H. Carter
By Glascock Downing & Seebold
Attys.

Inventor
A. W. H. Carter
By Glascock Downing & Seebold
Attys.

2,924,823

SEPARATE ADJACENT ANTENNAS FOR DIFFERENT BANDS WITH MEANS TO REDUCE CROSS COUPLING

Arthur William Henry Carter, Kew, England, assignor to Electric & Musical Industries Limited, Middlesex, England, a company of Great Britain

Application October 10, 1955, Serial No. 539,573

Claims priority, application Great Britain December 8, 1954

5 Claims. (Cl. 343—751)

This invention relates to aerials and relates especially to aerial arrangements which are capable of receiving television signals in widely separated frequency bands.

Television programmes are at present radiated in Britain on a carrier wave whose frequencies lie in band I (40–70 mc./s.) but it is now proposed to radiate further programmes on carrier waves having frequencies in band III (174–216 mc./s.) and possibly in bands IV (470–585 mc./s.) and V (610–960 mc./s.). A problem therefore arises of devising a compound aerial which is simple and inexpensive, and can operate in band I and over the whole of, say, band III with preferably a single common feeder.

A similar problem may arise in other cases, and one object of the present invention is to reduce such problems.

According to the present invention there is provided an aerial arrangement comprising two aerials adapted to work in different frequency bands and mounted in such close proximity that cross coupling between the aerials could occur, wherein one of said aerials is loaded to cause the phase velocity of currents in said aerial to differ from that in the other aerial to such an extent that the cross coupling which would otherwise occur is substantially reduced, and wherein the aerial adapted to receive signals in the higher frequency band comprises an H. type aerial mounted astride a limb of the other aerial.

Preferably in accordance with the present invention the loaded aerial is capacity loaded and constitutes said H. type aerial.

The loaded aerial may be constructed as described in United States patent specification No. 2,715,184 although other constructions may also be adopted as will hereinafter appear.

While the invention is especially applicable to aerials for receiving television and other high frequency signals, aerials according to the invention may also be used in some cases for transmitting purposes, and it is not confined to the reception and transmission of signals in bands I and III.

In order that the invention may be clearly understood and readily carried into effect, the invention will be described with reference to the accompanying drawings, in which.

Figures 1, 2, 3:
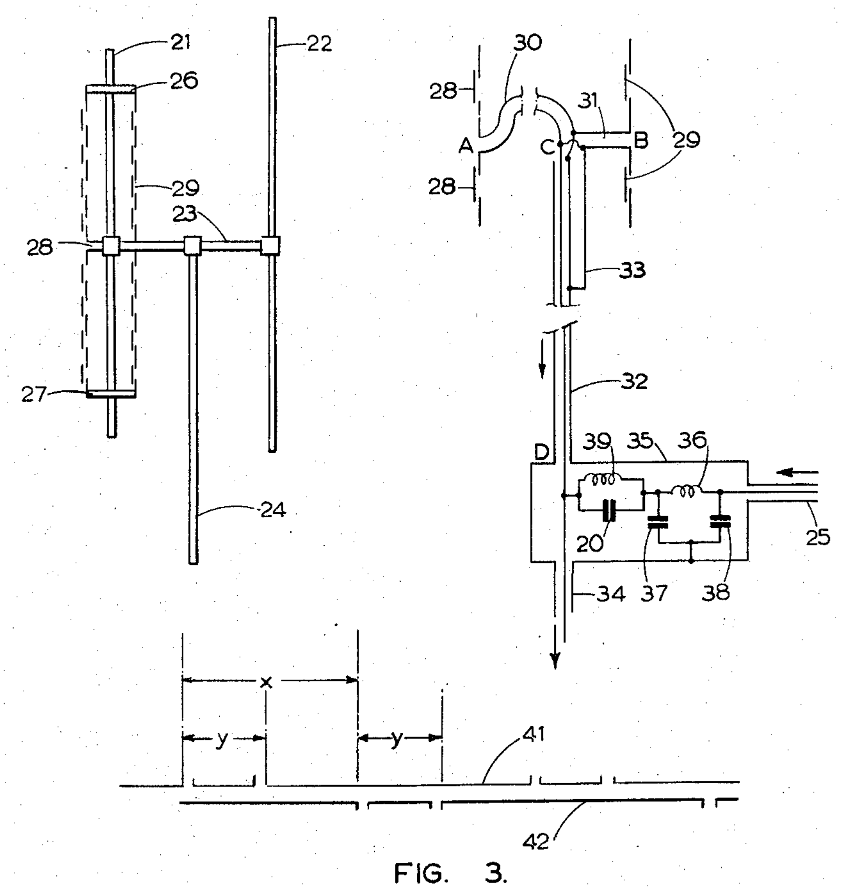
Figure 1 illustrates an example of a television receiving aerial arrangement according to the present invention, in which the loaded aerial is a capacity loaded aerial having parallel limbs mounted astride an unloaded dipole.
Figure 2 is a diagram of circuit connections to the aerial shown in Figure 1.
Figure 3 shows the construction of the capacity loaded elements which are used in the aerial of Figure 1.

The aerial shown in Figure 1 comprises an aerial having parallel limbs adapted to receive television signals having frequencies in band I, this aerial comprising two limbs 21 and 22 connected together by a cross limb 23 and supported by a mast 24. Two halves of the limb 21 form an unloaded dipole, the limb 22 forms a reflector for this dipole, and the two halves of the limb 21 are connected in any suitable manner to the inner and outer conductors of a co-axial feeder, a fragment of which is represented by the reference 25 in Figure 2. Two metal yokes 26 and 27 are attached to the limb 21 near the top and bottom thereof as represented in Figure 1 and these yokes support the limbs 28 and 29 of a capacity loaded serial adapted for reception of television signals having frequencies in band III. A suitable construction for the yokes 26, 27 is illusrtated in Figure 4.

The loading of the aerial comprising limbs 28 and 29 is in the form of capacitance distributed at intervals along the wire and it has the effect of increasing the phase velocity of current in the aerial so that waves set up in it have a substantially different velocity from waves set up in the dipole 21. Waves in the two aerials 21 and 28, 29 have, therefore, little common ground for interaction and the loaded aerial is very little affected by the close presence of the metal structure which forms the dipole 21. The coupling between the aerials is therefore very small although their proximity is such that the coupling between them would otherwise be substantial. The separation of the limbs 28 and 29 is less than a quarter wavelength of the frequency to be received and both limbs are arranged to function as dipoles feeding signals to the television receiver. For example the spacing between the limbs 28 and 29 may be approximately $\lambda/5$, where $\lambda$ is the wavelength to be received, and in a practical case the spacing may be 12 inches. The band III aerial formed by the elements 26, 27, 28 and 29 may be oriented as desired about the longitudinal axis of the limb 21.

At the point where the two aerials are connected to the feeder, it is necessary to ensure that energy is not diverted from one aerial into the other. In the case of the higher frequency loaded aerial, this will act as a high pass filter which presents a high impedance at the band I frequencies, and therefore does not accept appreciable energy from the band I aerial.

The band I lower frequency folded dipole should also present a high impedance in band III at the common junction, but because this aerial may have various lengths according to which band I channel it is to receive, it may not always of itself fulfil this condition. Moreover some leakage of higher frequency energy may occur from the loaded dipole to the unloaded dipole due to stray couplings at the aerial terminals, tending to a reduction of the angle of the main lobe of the radiation pattern for the loaded dipole, and to an increased production of minor lobes. In most cases it is therefore desirable to include in series with the folded dipole some network, such as a suitable length of feeder, or a filter which offers a barrier to band III currents without affecting the operation in band I. When a suitable filter is inserted in this way, substantial reduction in the minor lobes can be achieved and the condition that the minor lobes are a minimum is a sensitive test of the effectiveness of the filter.

Thus, in order that the signals may be fed to the television receiver from the band III aerial, the halves of the limb 28 are connected, as shown in Figure 2, to the conductors of a twin feeder 30 having a characteristic impedance of 150 ohms. Similarly the halves of the limb 29 are connected to the conductors of a twin feeder 31 also having a characteristic impedance of 150 ohms. The conductors of the feeders 30 and 31 are connected together at their inner ends and are connected to the conductors of a coaxial feeder 32, via a balance-to-unbalance transformer 33 of the construction described in United States patent specification No. 2,127,088. The two coaxial feeders 25 and 32, leading respectively from the band I and band III aerials, are connected as shown to a common coaxial feeder 34 leading to the television receiver, a filter 35 being introduced between the feeder 25 and the common feeder 34. The filter 35 comprises a section adapted to pass a signal having frequencies in band I and consisting of an inductor 36 and capacitors 37 and 38. The filter further comprises a section adapted to stop signals having frequencies in band III and consisting of inductor 39 and capacitor 40. Moreover, the length of the coaxial feeder between the points denoted by C and D in Figure 2 is arranged to be of such length that the impedance at D looking towards the point C is higher for frequencies in band I. In a practical case, for example, CD may be 76 inches and the characteristic impedance of the feeder 13 may be 70 ohms. The length of twin feeder 30 between the point A and C may be 30 inches and the length of feeder 31 between the point B and C may be 14 inches.

The capacity-loaded limbs 28 and 29 of the band III aerial may conveniently be formed from twin feeder having a characteristic impedance of 80 ohms. In Figure 3 the two conductors of said feeder are represented by the references 41 and 42 and they are formed into capacity loaded elements by cutting the conductors as indicated, without however removing alternate sections of the conductors. The separation of the cuts may for example be such that the lengths denoted as $x$ and $y$ in Figure 3 are 5.45 inches and 2.60 inches respectively. An aerial formed by such elements has a capactive loading impedance of about 180 ohms at 180 mc./s. The short alternate sections of each conductor formed by cutting may nevertheless be removed if desired.

Figure 4:
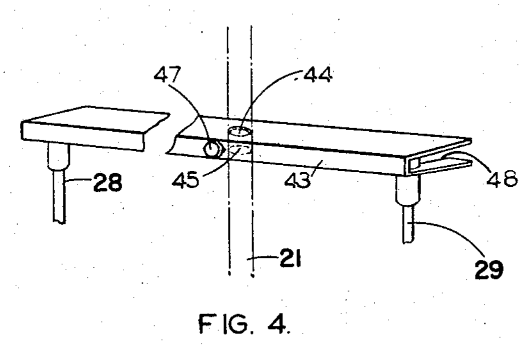
Figure 4 shows a suitable form of yoke which can be used for mounting the capacity loaded H-type aerial astride the other dipole.

Figure 4 shows a construction which can be used for the yokes 26 and 27.

Figure 5:
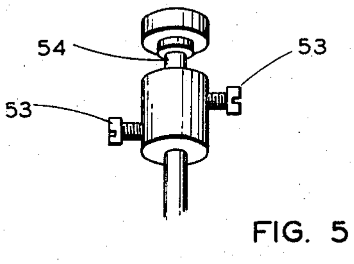
Figure 5 is a perspective detail of a nipple, and Figures *6a* and *6b* show longitudinal and transverse sectional details, respectively, of one of the limbs.
Figure 6A:
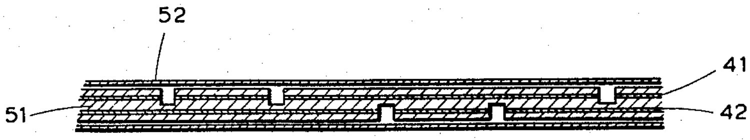
Figure 6B:
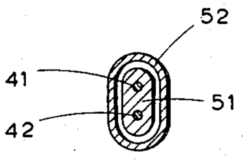

Figures 6*a* and 6*b* show one of the limbs 28 or 29 enclosed in a polyvinyl chloride sheath 52. The conductors 41 and 42 are moulded into polyvinyl chloride and have notches which are taken out at intervals as described with reference to Figure 3, so that the conductors are divided to provide the requisite capacitive loading. To support the limbs 28 and 29, they are provided at each end with a nipple of the type illustrated in Figure 5. The inside end of each nipple is provided with a coaxial hole with a pair of offset set screws 53 for clamping the end of a loaded aerial limb into the nipple and the outer end is furnished with a section 54 capable of slipping over and then dropping into a key-hole slot in the yokes 26 or 27. Thus, yoke 26 for example comprises an aluminum spar 43 U-shaped in cross-section and having lateral holes 44 and 45 on the sides of the U-section. The sides of the U diverge slightly but can be sprung into parallel relation and the holes 44 and 45 are so arranged that they are aligned when the sides of the U are parallel. The spar 43 can then be threaded easily on to the dipole 21 which is represented by the chain dotted outline in Figure 4. When the sides of the spar are released, the arms of the spar diverge resiliently and grip the limb 21 of the dipole tightly. The locking stud 47 is also provided for additional locking of the spar 43 on the dipole limb. Key-hole slots are formed adjacent the ends of one side of the U-shaped spar 43, and one of the key hole slots is visible in Figure 4 and is denoted by the reference 48. The ends of the respective limbs 28 and 29 of the capacity loaded aerial as described with reference to Figure 5 and 6, are fitted into these key hole slots.

What I claim is:

1. An aerial arrangement operable in two different frequency bands comprising a first aerial having at least one substantially rigid limb, and a second aerial comprising parallel limbs supported by and disposed on opposite sides of said substantially rigid limb, in proximity thereto, both said aerials being substantially wholly exposed for radiation and having feed points for energy transfer to or from said aerials, and one of said aerials having reactive loading distributed on it to produce a substantial difference between the phase velocities for currents in said aerials, thereby to substantially reduce cross coupling which would otherwise occur between said aerials due to their proximity.

2. An aerial arrangement operable in two different frequency bands comprising a first aerial having at least one substantially rigid limb, and a second aerial comprising parallel limbs supported by and disposed on opposite sides of said substantially rigid limb in proximity thereto, both said aerials being substantially exposed for radiation and having feed points for energy transfer to or from said aerials, and said second aerial being operative in the higher of said frequency bands and having capacitive loading distributed along its limbs to reduce cross coupling which could otherwise occur between said aerials due to their proximity.

3. An aerial arrangement according to claim 2 wherein said limbs of said second aerial comprise parallel conductors, each interrupted at intervals, the interruptions of one conductor being staggered relative to the interruptions of the other conductor to produce the capacitive loading of the respective limb.

4. An aerial arrangement according to claim 1, said first aerial comprising a further limb parallel to said first limb and disposed as a reflector for said first limb.

5. An aerial arrangement according to claim 1 wherein said limbs of said second aerial are suspended between yokes, each yoke having a U-shaped cross section with the sides of the U divergent and having corresponding holes in said sides, said yokes being mounted on the substantially rigid limb of the first aerial with said rigid limb projecting through said holes and gripped by the yokes due to the divergence of the sides thereof.

References Cited in the file of this patent

UNITED STATES PATENTS

| | | |
|---|---|---|
| 1,531,029 | Ryan | Mar. 24, 1925 |
| 2,622,197 | Cruser | Dec. 16, 1952 |

FOREIGN PATENTS

| | | |
|---|---|---|
| 628,986 | Great Britain | Sept. 8, 1949 |

OTHER REFERENCES

Article, "The Zig-Zag Array" by Steidley in "CQ," January 1950, page 18, et seq.